(12) United States Patent
Houser

(10) Patent No.: US 8,950,557 B2
(45) Date of Patent: Feb. 10, 2015

(54) SYSTEMS AND METHODS FOR AN IMPROVED TORQUE TUBE

(75) Inventor: Joshua Craig Houser, Wapakoneta, OH (US)

(73) Assignee: Goodrich Corporation, Charlotte, NC (US)

( * ) Notice: Subject to any disclaimer, the term of this patent is extended or adjusted under 35 U.S.C. 154(b) by 386 days.

(21) Appl. No.: 13/368,013

(22) Filed: Feb. 7, 2012

(65) Prior Publication Data
US 2013/0199878 A1    Aug. 8, 2013

(51) Int. Cl.
*F16D 55/36* (2006.01)

(52) U.S. Cl.
USPC ........................................ 188/71.5; 192/70.2

(58) Field of Classification Search
CPC ............... F16D 2065/1368; F16D 2065/1392; F16D 55/36
USPC .............................. 188/71.5; 192/70.19, 70.2
See application file for complete search history.

(56) References Cited

U.S. PATENT DOCUMENTS

| 5,310,025 | A  | * | 5/1994  | Anderson       | 188/73.37   |
|-----------|----|---|---------|----------------|-------------|
| 5,323,881 | A  | * | 6/1994  | Machan et al.  | 188/71.5    |
| 5,485,898 | A  | * | 1/1996  | Patko          | 188/71.5    |
| 7,509,710 | B1 | * | 3/2009  | Lin et al.     | 16/337      |
| 2003/0111304 | A1 | * | 6/2003  | Evrard      | 188/71.1    |
| 2006/0201754 | A1 | * | 9/2006  | Dyko et al. | 188/71.5    |
| 2007/0193836 | A1 | * | 8/2007  | Walker et al. | 188/218 XL |
| 2008/0302614 | A1 | * | 12/2008 | Souetre     | 188/71.5    |
| 2012/0325594 | A1 | * | 12/2012 | Rook et al. | 188/71.5    |

* cited by examiner

*Primary Examiner* — Robert A Siconolfi
*Assistant Examiner* — Charles Poon
(74) *Attorney, Agent, or Firm* — Snell & Wilmer L.L.P.

(57) ABSTRACT

Systems and methods disclosed herein may be useful for improved torque tubes. In this regard, an apparatus is provided comprising a torque tube having an axis, a proximal terminus and a distal back leg, a first spline circumferentially disposed on the torque tube, a second spline circumferentially disposed on the torque tube, the first spline extending from a first location proximal to the distal back leg to a first terminal point, and the second spline extending from a second location proximal to the distal hack leg to a second terminal point, the second terminal point being distal to the first terminal point.

10 Claims, 4 Drawing Sheets

000
SYSTEMS AND METHODS FOR AN IMPROVED TORQUE TUBE

FIELD

The present disclosure is related to systems and methods for improved torque tubes.

BACKGROUND

In aircraft, light weight components are generally preferred. Thus, aircraft components, such as a torque tube, may be improved by reducing weight while maintaining functionality. An aircraft brake generally comprises a friction brake mechanism including a torque tube.

SUMMARY

Systems and methods disclosed herein may be useful for improved torque tubes. In this regard, an apparatus is provided comprising a torque tube having an axis, a proximal terminus and a distal hack leg, a first spline circumferentially disposed on the torque tube, a second spline circumferentially disposed on the torque tube, the first spline extending from a first location proximal to the distal back leg to a first terminal point, and the second spline extending from a second location proximal to the distal back leg to a second terminal point, the second terminal point being distal to the first terminal point.

In various embodiments, a method is provided comprising fabricating a torque tube having an axis, a proximal terminus, a distal back leg, a first spline circumferentially disposed on the torque tube, and a second spline circumferentially disposed on the torque tube, wherein the first spline extends from a first location proximal to the distal back leg to a first terminal point, removing material from the second spline so that the second spline extends from a second location proximal to the distal back leg to a second terminal point, the second terminal point being distal to the first terminal point.

In various embodiments, a braking assembly is provided comprising a torque tube having an axis, a proximal terminus, a distal back leg, a first spline circumferentially disposed on the torque tube, and a second spline circumferentially disposed on the torque tube, and a pressure plate engaging the first spline and not engaging the second spline.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
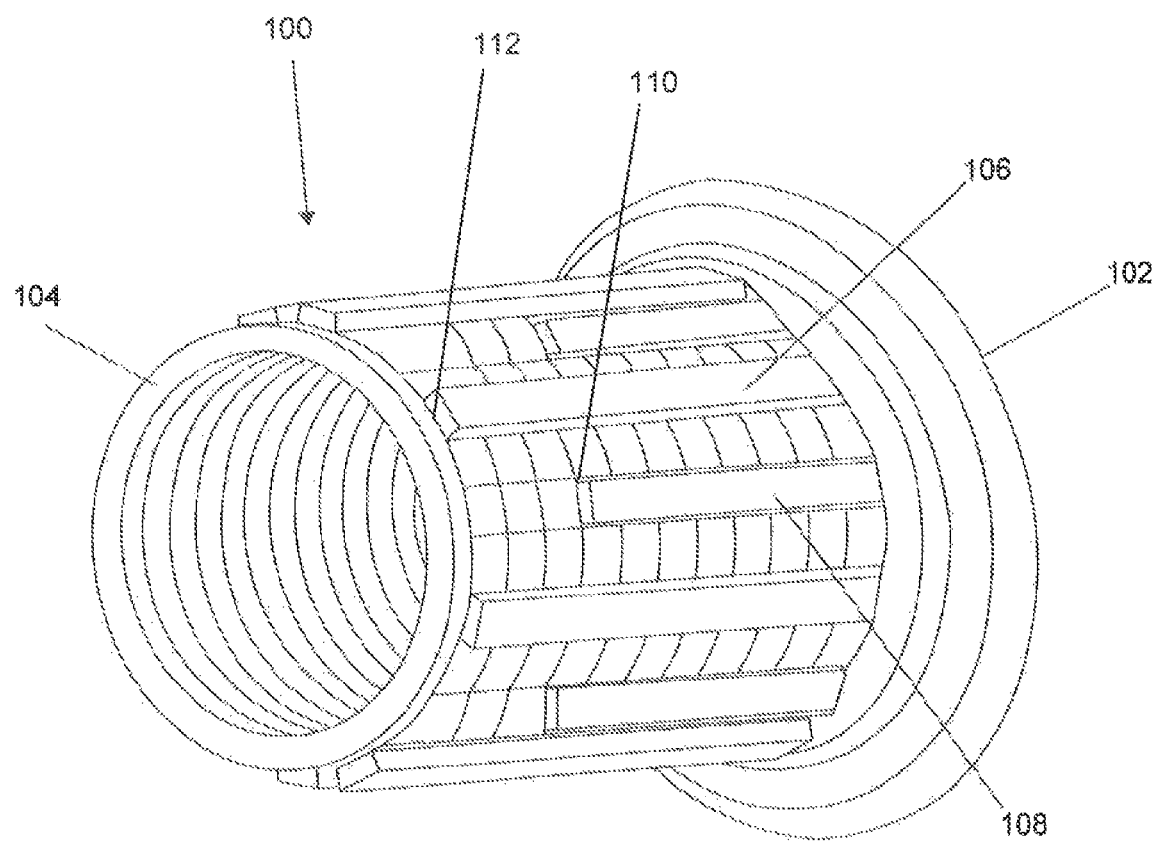
FIG. 1 illustrates a torque tube in accordance with various embodiments.

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed may be useful for improved torque tubes. Although the embodiments are described with reference to improved torque tubes used in connection with aircraft, such embodiments are provided for example only, as it is contemplated that the disclosures herein have applicability to other vehicles, such as for example, automobiles.

Aircraft may comprise one or more types of aircraft wheel and brake assemblies. For example, an aircraft wheel and brake assembly may comprise a non-rotatable wheel support, a wheel mounted to the wheel support for rotation, and a brake disk stack (also referred to as a brake assembly). An aircraft brake generally comprises a friction brake mechanism including a pressure plate adjacent to a means for exerting force such as hydraulic piston motor or one or more electromechanical actuators.

An aircraft brake typically further comprises an end plate distal from the means for exerting force and a plurality of interleaved rotor disks and stator disks which together form the brake heat sink. Each rotor disk may be coupled to the wheel for rotation therewith and each stator disk is coupled to the wheel support against rotation. The friction brake mechanism also generally includes a torque tube and a back leg on which a pressure plate, end plate and stator disks are slidably mounted against rotation relative to the wheel and rotor disks. The stator disks may comprise two wear faces and the pressure plate may comprise a single wear face. A brake head may house the piston motor or more actuator rams that extend to move the pressure plate and compress the brake disk stack against the end plate.

The actuator rains may be electrically operated actuator rams or hydraulically operated actuator rams, although some brakes may use pneumatically operated actuator rams. In brake systems that employ fluid powered (hydraulic or pneumatic power) actuator rams, the actuator rain may be coupled to a power source via a brake servo valve ("BSV") and a shutoff valve ("SOV"). The SOV effectively functions as a shutoff valve, wherein in a first position (e.g., an aimed position), fluid pressure is permitted to pass through the valve, while in a second position (e.g., a disarmed position) fluid pressure is prevented from passing through the valve. During normal braking, the SOV is in the armed position, thereby permitting the flow of fluid pressure. The BSV, based on braking commands from the pilot (often via an electronic controller that may implement, for example, anti-skid logic), controls the amount of fluid pressure provided to the actuator ram, and thus, the braking force applied to the wheel. To prevent unintentional braking (e.g., due to a faulty servo valve) at various times, the SOV is set in the disarmed position, thereby removing fluid pressure from the BSV. Since the BSV does not receive fluid pressure, it cannot provide fluid pressure to the actuator rain, and thus, braking cannot be effected.

In electronic brakes, a brake controller is coupled to one or more electromechanical actuator controllers ("EMAC") for a brake, which drives one or more electromechanical brake actuators. The brake controller may be in communication with a brake pedal, and thus may control the EMAC in accordance with pilot/copilot braking commands.

A torque tube may have one or more circumferentially disposed splines that engage the pressure plate and the stator disks. The pressure plate and stator disks may engage the spline with a lug, or "cutout," that is configured to accept a spline. The linkage of a stator disk or pressure plate to the splines allows for the transfer of torque. The number of splines on a torque tube is thus in part dependent upon the type of brake and the anticipated torque load on the stator disks, among other factors. As described above, the stator disks may comprise two wear faces while a pressure plate may comprise a single wear face. Thus, during braking, the pressure plate will transfer approximately half the torque of a stator disk. Yet, the number of splines, and thus the weight of the torque tube, is dependent upon the anticipated torque-load on the stator discs.

It is thus advantageous for a torque tube to decouple the torque transfer needs of the stator disks from those of the pressure plate. By reducing the number of splines that engage the pressure plate while maintaining a greater number of splines engaging the stator disks, one may reduce the weight of a torque tube and still maintain all or substantially all the torque transfer capabilities of a torque tube. Stated another way, it is advantageous to independently select the number of splines that will engage the pressure plate, without influence from the selection of the number of splines that will engage the stator disks.

With reference to FIG. 1, torque tube 100 is shown. Back leg 102 is shown at a distal end, or terminus, of torque tube 100. Proximal end 104 is shown proximal to the back leg 102. Circumferentially disposed splines are shown on torque tube 100. Spline 106 is shown extending from a point proximal to back leg 102 to a first terminal point near the proximal end 104. Short spline 108 is shown extending from a point proximal to back leg 102 to a second terminal point, where the second terminal point is distal to the first terminal point. Thus, short spline 108 has a shorter axial length than spline 106.

Short spline 108 and spline 106 are shown as originating on the same circumferential surface. A circumferential surface may include a surface the spans all or part of the circumference of a torque tube. Stated another way, both short spline 108 and spline 106 are substantially axially equidistant from back leg 102, in various embodiments, however, a short spline and a spline are not equidistant from a back leg. First circumferential surface 112 and second circumferential surface 110 are illustrated in FIG. 1.

As described above, a spline may engage both the pressure plate and a stator disk via lugs on the pressure plate or stator disk. A short spline, as described herein, may extend as far in the proximal direction as a spline and thus would engage the stator disks. A short spline, in various embodiments, may not engage the pressure plate. The shorter spline length reduces weight of the torque tube while maintaining appropriate torque transfer ability with respect to the stator disk and the pressure plate.

Figure 2:
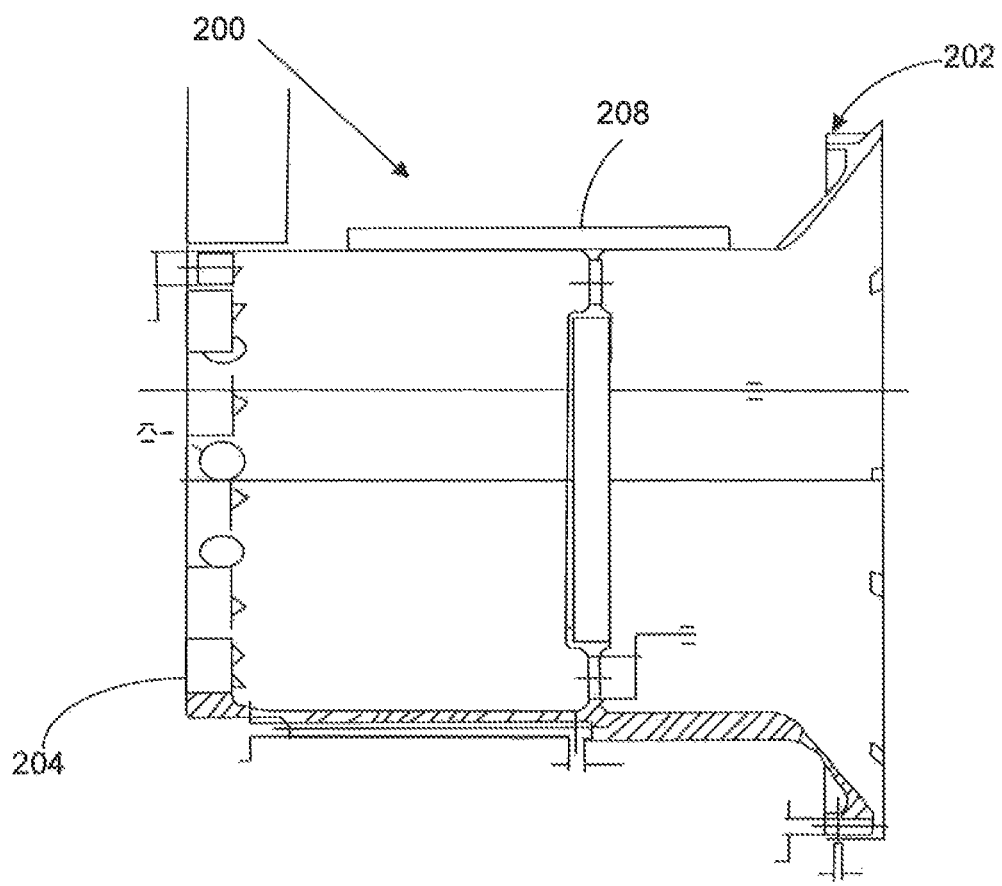
FIG. 2 illustrates a cross section of a torque tube, in accordance with various embodiments.

With reference to FIG. 2, torque tube 200 is shown from a cross section perspective. Back leg 202 is shown at a distal terminus of torque tube 200. Proximal end 204 is shown proximal to the back leg 202. Short spline 208 is shown originating at a point proximal to the back leg 202 and terminating at a point distal to the proximal end 204. Torque tube 200 also comprises a spline that originates at a location on the same circumferential surface as short spline 208 but terminates at a point proximal to the termination point of short spline 208.

The ratio of splines to short splines may be selected based upon, in part, the desired torque transfer load of the pressure plate and the stator disks. In various embodiments, the ratio of splines to short splines is from 10:1 to 1:10, more preferably from 8:1 to 1:5 and preferably still from 4:1 to 1:1. In various embodiments, the ratio of splines to short splines is greater than 1:1, as the pressure plate tends to transfer approximately half the torque of the stator disks. Splines and short splines may be distributed about a torque tube in any suitable configuration, including asymmetrically or symmetrically.

Figure 3:
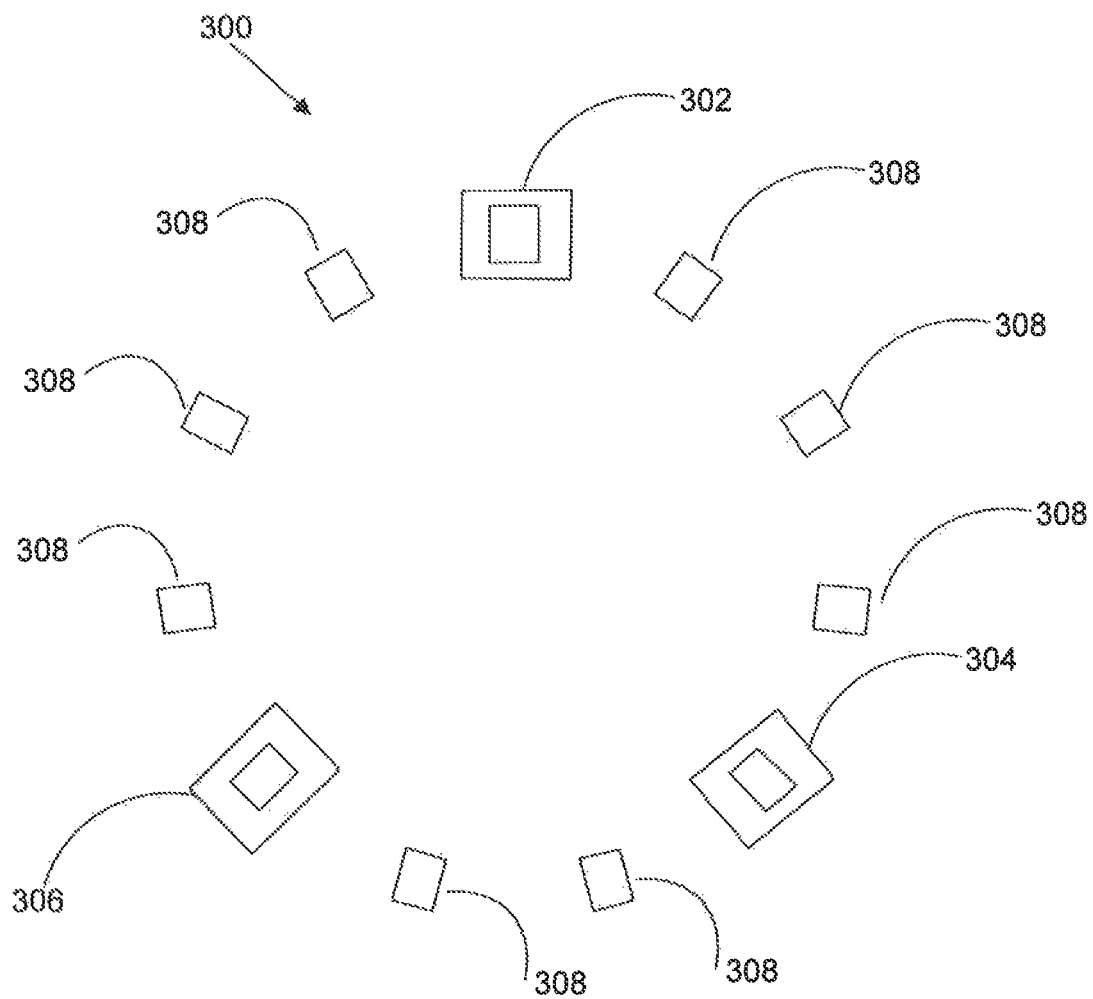
FIG. 3 illustrates an axial view of a torque tube in accordance with various embodiments.

As shown in FIG. 3, torque tube 300 is shown in an axial view. Splines 308 are shown disposed circumferentially about torque tube 300. Short splines 302, 304 and 306 are labeled accordingly and illustrated within squares for clarity purposes. There are eleven total splines in torque tube 300, comprising three short splines 302, 304, and 306 and eight splines 308.

Stator disks and a pressure plate have lugs to engage one or more of the splines of a torque tube. In various embodiments, a lug may be configured to be a "tight" fit, meaning that the lug is cut to a size that closely corresponds with the spline. In various embodiments, a lug may be configured to be slightly larger than the corresponding lug, allowing limited movement between the lug and spline, which may be referred to as a "medium" fit. In various embodiments, a lug may be significantly larger than the corresponding spline, which may be referred to as a "loose" fit.

Figure 4:
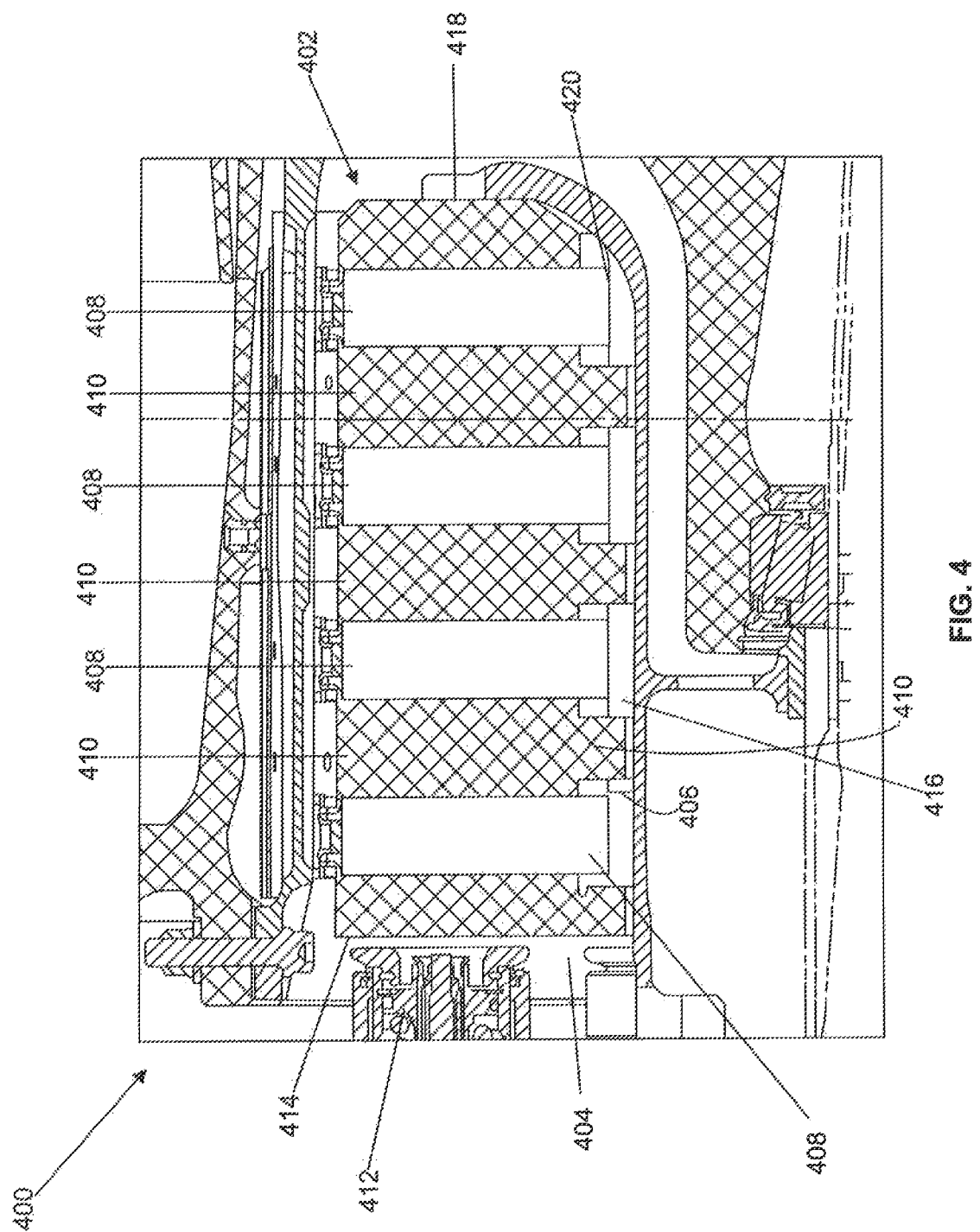
FIG. 4 illustrates a cross section of a braking assembly in accordance with various embodiments.

With reference to FIG. 4, brake assembly 400 is shown. A distal portion of a torque tube is shown at distal portion 402. Proximal portion 404 is shown proximal to distal portion 402.

Ram 412 is shown proximal to pressure plate 414. Rotors 408 are shown disposed coaxially with pressure plate 414. Stators 410 are shown disposed coaxially with rotors 408. End plate 418 is shown disposed coaxially with stators 410.

During braking, ram 412 engages pressure plate 414, urging pressure plate 414 to move in a distal direction and urging pressure plate 414 into engagement with the brake stack, which comprises stators 410 and rotors 408.

Torque tube 420 is shown engaged with stators 410 via short spline 416. Short spline 416 engages short spline 416 via a lug. Short spline 416 thus transfers torque from torque tube 420 to the stators 410. During braking, the friction created between rotors 408 and stators 410 oppose rotation of the wheel and torque is thus transferred between stators 410 and torque tube 420 via a lug of stators 410 and short spline 416.

Short spline 416 is illustrated as terminating at a point distal to pressure plate 414. The termination point of short spline 416 is labeled as point 406. Thus, short spline 416 does not engage pressure plate 414 and thus does not transfer torque to pressure plate 414.

One or more splines of torque tube 420 extend to a point proximal to the termination point of short spline 416 and engage pressure plate 414. In this regard, the pressure plate 414 may transfer torque to torque tube 420 via such a spline. As described above, one or more splines of torque tube 420 that extend to a point proximal to the termination point of short spline 416 may engage stators 410. In this regard, stators 410 may transfer torque to torque tube 420 via such spline.

The selection of lug size may be dependent upon the aircraft, the torque loads contemplated, and the particular component containing the lug. For example, a lug on a stator disk may have a tight fit to engage a spline. Also for example, a lug on a pressure plate that is configured to axially align with a short spline may have a loose fit. As described above, a lug on a pressure plate that axially aligns with a short spline may not engage the short spline, and thus no torque is transferred. However, as the friction material wears, the axial length the brake stack decreases. For example, rotors 408 may decrease in axial width as rotors 408 wear. Thus, the pressure plate moves increasing distally along the torque tube over time. In various embodiments, a shortened spline is configured so that it would not engage a pressure plate under normal operating conditions (e.g., while the friction material has acceptable wear). However, in various embodiments, and for example, when a brake stack is not properly maintained, it may be advantageous for the pressure plate to have loose lugs. In this manner, even if the short spline and the pressure plate lug were to align, the oversized nature of the loose lug would prevent engagement. In addition, the larger the lug, the less pressure plate material is used and thus the brake assembly has reduced overall weight.

In this regard, pressure plate 414 may comprise loose fit lugs relative to short spline 416. As components wear, pressure plate 414 may travel a greater axial distance during braking. Accordingly, in the event pressure plate 414 approaches point 406, the loose fit lug of pressure plate 414 will allow pressure plate 414 to pass over short spline 416 and not inhibit or otherwise impair braking ability.

Torque tubes as disclosed herein may be manufactured in any suitable manner. In various embodiments, a torque tube may be forged and, in further embodiments, a torque tube is cast. A toque tube may be cast with splines of substantially equal length so that the splines are an integral part of the torque tube. After casting, a torque tube may have a subset of its splines shortened in accordance with the present disclosure. The shortening (i.e., removal of material) may be performed using any suitable technique, such as machining, grinding, laser cutting, torch cutting, and the like. In further embodiments, splines of a torque tube may be cast to approximately the desired finished length and then lightly sanded or otherwise finished.

The splines of a forged torque tube may be shaped and sized during the forging process. In various embodiments, the back leg is integral to the torque tube, though in further embodiments, the torque tube and back leg may be fabricated separately and joined together. A torque tube may comprise any suitable material, such as stainless steel, titanium, aluminum, or other like material.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
   a torque tube having an axis, a proximal terminus and a distal back leg;
   a first spline circumferentially disposed on the torque tube;
   a second spline circumferentially disposed on the torque tube;
   the first spline extending from a first location proximal to the distal back leg to a first terminal point; and
   the second spline extending from a second location proximal to the distal back leg to a second terminal point, the second terminal point being distal to the first terminal point,
   wherein the first spline engages an axially moveable, nonrotatable pressure plate,
   wherein the second spline does not engage the axially moveable, nonrotatable pressure plate.

2. The apparatus of claim 1, wherein the first spline is a member of a first plurality of splines and wherein the second spline is a member of a second plurality of splines.

3. The apparatus of claim 2, wherein each spline in the first plurality of splines has the same length and wherein each spline in the second plurality of splines has the same length.

4. The apparatus of claim 3, wherein each spline in the first plurality of splines extends from a first circumferential surface of the torque tube, the first circumferential surface including the first location.

5. The apparatus of claim 4, wherein each spline in the second plurality of splines extends to a second circumferential surface of the torque tube, the second circumferential surface including the second terminal point.

6. The apparatus of claim 2, wherein the ratio of splines in the first plurality of splines to splines in the second plurality of splines is from 1:1 to 5:1.

7. The apparatus of claim 1, wherein the first spline and the second spline are disposed asymmetrically about the axis.

8. The apparatus of claim 1, wherein the first spline and the second spline are disposed symmetrically about the axis.

9. The apparatus of claim 1, wherein the first spline further engages the axially moveable nonrotatable stator disk.

10. The apparatus of claim 9, wherein the second spline engages the axially moveable nonrotatable stator disk.

\* \* \* \* \*